United States Patent
Gradone

[11] 3,712,296
[45] Jan. 23, 1973

[54] SWAB DEVICE FOR MEDICAL SPECIMENS

[76] Inventor: Frank P. Gradone, 49 Midland Place, Newark, N.J. 07106

[22] Filed: Dec. 8, 1970

[21] Appl. No.: 96,094

[52] U.S. Cl. ................................128/2 W, 128/269
[51] Int. Cl. ................................A61b 10/00
[58] Field of Search ......128/2 B, 2 W, 2 R, 269, 263, 128/267, 270

[56] References Cited

UNITED STATES PATENTS

| | | | |
|---|---|---|---|
| 3,037,496 | 6/1962 | Melges | 128/2 W |
| 3,086,527 | 4/1963 | Forrest | 128/263 |
| 3,394,699 | 7/1968 | Koett | 128/2 B |
| 3,513,830 | 5/1970 | Kalayjian | 128/2 W |
| 3,512,518 | 5/1970 | Mishkin et al. | 128/2 B |
| 2,905,169 | 9/1959 | Nieburgs | 128/2 B |
| 2,847,000 | 8/1958 | Nieburgs | 128/2 B |
| 3,450,129 | 6/1969 | Avery et al. | 128/2 W |
| 3,368,549 | 2/1968 | Barr et al. | 128/2 W |
| 3,409,011 | 11/1968 | Mittag | 128/263 |
| 3,499,447 | 3/1970 | Mattes et al. | 128/263 |

*Primary Examiner*—Kyle L. Howell
*Attorney*—Lane, Aitken, Dunner & Ziems

[57] ABSTRACT

A swab device wherein a rod having a specimen receiving material attached thereto is carried by a sleeve during receipt of the specimen, and is adapted to be pushed out of the sleeve for testing purposes without being contacted by human hands.

1 Claim, 3 Drawing Figures

PATENTED JAN 23 1973 3,712,296

INVENTOR
FRANK P. GRADONE

BY Lane, Aitken, Dunner & Ziems
ATTORNEYS

SWAB DEVICE FOR MEDICAL SPECIMENS

BACKGROUND OF THE INVENTION

This invention relates to a swab device, and more particularly, to such a device for taking a specimen for testing in medical applications.

A common device for taking specimens for medical testing is the swab stick, which is in the form of a ball of cotton wound around and attached to a wooden stick. It is common practice to use a swab stick to take a specimen from a patient, and then insert the cotton end portion of the stick into a test tube, or other vessel, containing a culture medium for testing the specimen. As a result, human hands may touch the portion of the stick which is inserted into the test tube which can cause contamination of the specimen.

The danger of contamination is even greater when a relatively long stick is required, such as when the specimen is taken from the patient's throat. In this case, the stick must often be manually broken so that the swab portion will fit into the test tube. Of course, this manual contact greatly increases the risk of contamination.

SUMMARY OF THE INVENTION

It is therefore an object of the present invention to provide a culture swab device wherein a specimen may be taken and inserted in a test tube without being contacted by human hands.

Toward the fulfillment of this object, the swab device of the present invention comprises means for receiving a specimen, means for holding said specimen receiving means, and means for releasing said specimen receiving means from said holding means without making manual contact with said specimen receiving means.

BRIEF DESCRIPTION OF THE DRAWINGS

Reference is now made to the accompanying drawings for a better understanding of the nature and objects of the present invention. The drawings illustrate the best mode presently contemplated for carrying out the objects of the invention and are not to be construed as restrictions or limitations on its scope. In the drawings.

DESCRIPTION OF THE PREFERRED EMBODIMENTS

Figure 1:
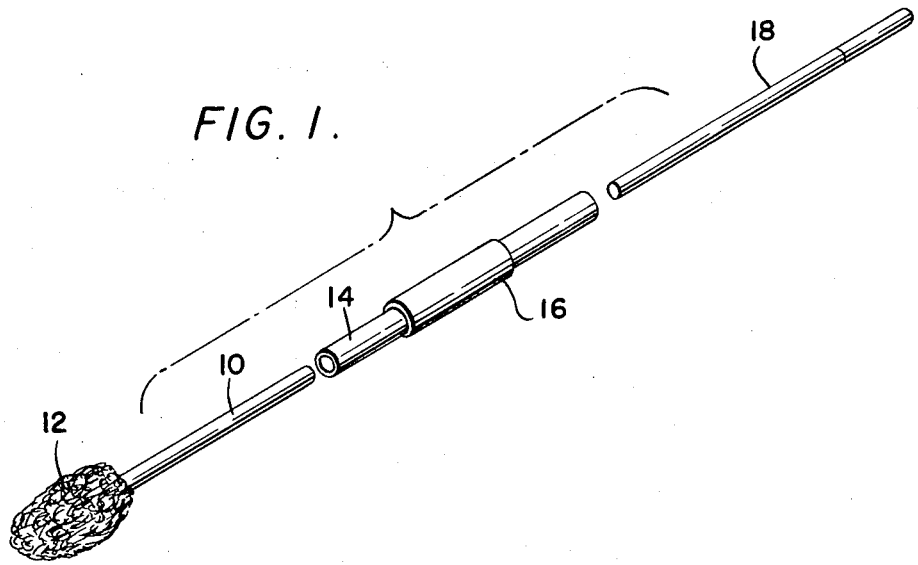
FIG. 1 is an exploded perspective view showing the various components of the swab device of the present invention.

The various components of the culture swab device of the present invention are shown in FIG. 1 of the drawings and include a rod 10 which, in a preferred embodiment, is in the form of a stick. A swab 12 of an absorbent material such as cotton, is attached to one end of the rod 10 and is wrapped therearound in a conventional manner. An elongated clear plastic sleeve 14 is adapted to receive the rod 10 with the diameter of the rod and the inner diameter of the sleeve being designed so that the rod can be forced to move axially within the sleeve, and yet is retained in the same during non-use. This can be achieved by a tight frictional fit between the inner sleeve surface and the outer rod surface, or by detents or the like being provided in the sleeve which engage the rod. An enlarged outer sleeve 16 extends over the sleeve 14, is fixed to the sleeve 14 in any conventional manner, and is of a smaller length than the sleeve 14.

A second rod 18, also preferably in the form of a stick and preferably the same diameter as the rod 10, is provided for pushing the latter rod out of the sleeve 14 in a manner that will be described in further detail later.

Figure 2:
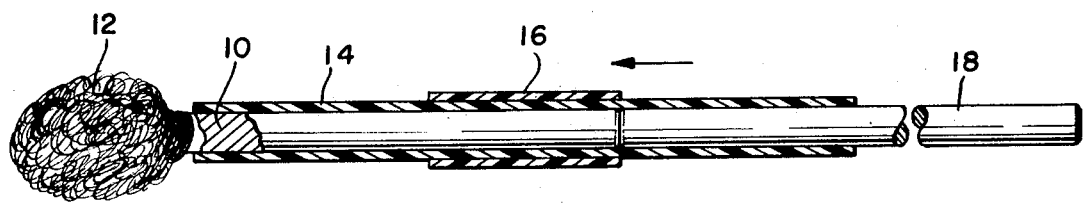
FIG. 2 is a side elevational view of the swab device of the present invention shown in a position adapted for packaging.
Figure 3:
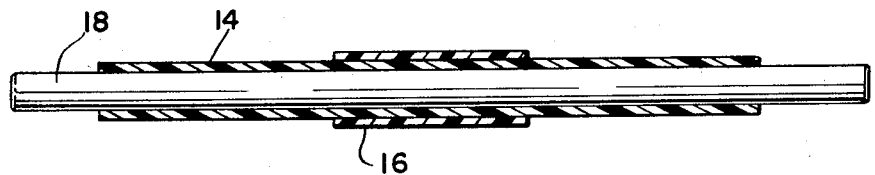
FIG. 3 is a view similar to FIG. 2 but depicting the device after the specimen receiving portion of the device has been released.

As shown in FIG. 2, the length of the rod 10 is less than the length of the sleeve 14, while the combined length of the rods 10 and 18 is greater than the length of the sleeve. The device is shown assembled for packaging, with the rod 10 extending completely within the sleeve 14 and the swab 12 disposed at the end of the sleeve. A portion of the rod 18 also extends within the sleeve 14, with its end in abutment with the corresponding end of the rod 10, with both rods being retained in this position by means of the above-described engagement with the sleeve. In this position, the device can easily be sterilized and packaged in a conventional manner.

When a specimen is desired to be taken and introduced into a culture medium, the package is broken, and the device is maintained in the assembled position shown in FIG. 2, with the operator grasping the sleeve 16. The device is then inserted in the area from which a specimen is to be taken, such as the throat of a patient, wherein the specimen is collected on the swab 12. After the specimen is taken the device, still being gripped in the above manner, is transferred to the immediate vicinity of the test tube or other vessel containing the culture medium. The rod 18 is then manually pushed in a direction indicated by the arrow in FIG. 2, whereby it forces the rod 10, along with the specimen in the swab 12, outwardly in the same direction until it drops into the culture medium.

It can be appreciated from the foregoing that the device of the present invention completely eliminates contamination of the specimen, since neither the rod 10 nor the absorbing material 12 is touched by human hands. Further, since the device is gripped by the outer sleeve 16, the sleeve 14 is also not touched, thus minimizing the probability of transferring germs or the like to the specimen.

Of course, variations of the specific construction and arrangement of the swab device disclosed above can be made by those skilled in the art without departing from the invention as defined in the appended claims.

I claim:

1. A swab device comprising a wooden stick, an absorbent material affixed to one end portion of said stick, an elongated sleeve extending over the entire length of said stick with the exception of said one end portion, the length of said sleeve being greater than the length of said stick, and a rod having a first portion extending in that portion of said sleeve not occupied by said stick and abutting said stick, and a second portion protruding from the end of said sleeve opposite from the end from which said end portion of said stick protrudes, the diameter of said stick and said rod and the inner diameter of said sleeve being substantially identical so that the inner wall of said sleeve engages the outer surfaces of said stick and said rod in a frictional fit to normally retain said stick and said rod in said sleeve while permitting movement of said stick relative to said rod so that an axial force applied against said second portion of said rod in the direction of said stick pushes said stick in said direction and releases said stick from said sleeve and said rod.

* * * * *